United States Patent
Berkley et al.

(10) Patent No.: US 7,408,920 B2
(45) Date of Patent: *Aug. 5, 2008

(54) ACTIVE USER REGISTRY

(75) Inventors: David Arthur Berkley, Summit, NJ (US); Lawrence Richard Rabiner, Berkeley Heights, NJ (US); Eric E. Sumner, Jr., Bernardsville, NJ (US)

(73) Assignee: AT&T Corp., New York, NY (US)

( * ) Notice: Subject to any disclaimer, the term of this patent is extended or adjusted under 35 U.S.C. 154(b) by 865 days.

This patent is subject to a terminal disclaimer.

(21) Appl. No.: 10/090,602

(22) Filed: Mar. 5, 2002

(65) Prior Publication Data
US 2002/0131573 A1    Sep. 19, 2002

Related U.S. Application Data

(63) Continuation of application No. 08/823,944, filed on Mar. 25, 1997, now Pat. No. 6,546,005.

(51) Int. Cl.
*H04L 12/66* (2006.01)
(52) U.S. Cl. .................. 370/352; 370/392; 370/475
(58) Field of Classification Search .............. 370/352, 370/357, 389, 351, 353, 354, 355, 356, 401, 370/466, 467, 471, 473, 474, 402, 403, 404, 370/405, 465, 229, 230, 231, 235, 237; 709/201, 709/202, 217, 218, 219; 379/201.01, 201, 379/207, 210, 211, 212, 220, 219, 221, 229; 707/3, 4, 5, 6
See application file for complete search history.

(56) References Cited

U.S. PATENT DOCUMENTS

| | | | | |
|---|---|---|---|---|
| 5,689,550 A * | 11/1997 | Garson et al. | ............ | 379/88.18 |
| 5,737,395 A * | 4/1998 | Irribarren | ................ | 379/88.13 |
| 5,740,230 A * | 4/1998 | Vaudreuil | ................ | 379/88.22 |
| 5,740,231 A * | 4/1998 | Cohn et al. | ............. | 379/88.22 |
| 6,072,862 A * | 6/2000 | Srinivasan | ............ | 379/100.08 |
| 6,075,796 A * | 6/2000 | Katseff et al. | ............... | 370/466 |
| 6,212,550 B1 * | 4/2001 | Segur | ......................... | 709/206 |
| 6,546,005 B1 * | 4/2003 | Berkley et al. | ............. | 370/353 |
| 6,754,181 B1 * | 6/2004 | Elliott et al. | ............... | 370/252 |
| 6,829,231 B1 * | 12/2004 | Wilson | ....................... | 370/352 |
| 2003/0193933 A1 * | 10/2003 | Jonas et al. | ................ | 370/352 |

* cited by examiner

*Primary Examiner*—Edan Orgad
*Assistant Examiner*—Jung Park

(57) ABSTRACT

An Active User Registry system includes a database which is integrated with the POTS network and a packet network to exploit the outstanding strengths of both of its constituents. The Active User Registry database is a dynamic data structure of all the ways in which one or more users can be reached via some type of communication network. A key feature of the Active User Registry is the ability to broker between a subscriber's request for communications contact information corresponding to a user and the user's preferences of being reached by various communications alternatives.

28 Claims, 7 Drawing Sheets

FIG. 2

| | 210 | 220 | 230 | 240 | 250 | 260 | 270 | 280 | 290 |
|---|---|---|---|---|---|---|---|---|---|
| USER 1 | Username UserAlias1 UserAlias2 ... | HomePhone1 HomePhone2 WorkPhone WorkSecretary CellularPhone1 VideoPhone | WorkVoiceMessages Home AnsweringMachine VideoMailMessages BeeperNumber1 ... | Email1 Email2 ... | WorkFAX1 WorkFAX2 HomeFAX | LAN IP ModemIP ... | URL1 URL2 ... | Multimedia1 Multimedia2 ... | Reach Number ... |
| USER 2 | Username UserAlias1 UserAlias2 ... | HomePhone1 HomePhone2 WorkPhone WorkSecretary CellularPhone1 VideoPhone | WorkVoiceMessages Home AnsweringMachine VideoMailMessages BeeperNumber1 ... | Email1 Email2 ... | WorkFAX1 WorkFAX2 HomeFAX | LAN IP ModemIP ... | URL1 URL2 ... | Multimedia1 Multimedia2 ... | Reach Number ... |
| USER 3 | Username UserAlias1 UserAlias2 ... | HomePhone1 HomePhone2 WorkPhone WorkSecretary CellularPhone1 VideoPhone | WorkVoiceMessages Home AnsweringMachine VideoMailMessages BeeperNumber1 ... | Email1 Email2 ... | WorkFAX1 WorkFAX2 HomeFAX | LAN IP ModemIP ... | URL1 URL2 ... | Multimedia1 Multimedia2 ... | Reach Number ... |
| ... | ... | ... | | ... | ... | ... | ... | ... | ... |
| USER N | Username UserAlias1 UserAlias2 ... | HomePhone1 HomePhone2 WorkPhone WorkSecretary CellularPhone1 VideoPhone | WorkVoiceMessages Home AnsweringMachine VideoMailMessages BeeperNumber1 ... | Email1 Email2 ... | WorkFAX1 WorkFAX2 HomeFAX | LAN IP ModemIP ... | URL1 URL2 ... | Multimedia1 Multimedia2 ... | Reach Number ... |

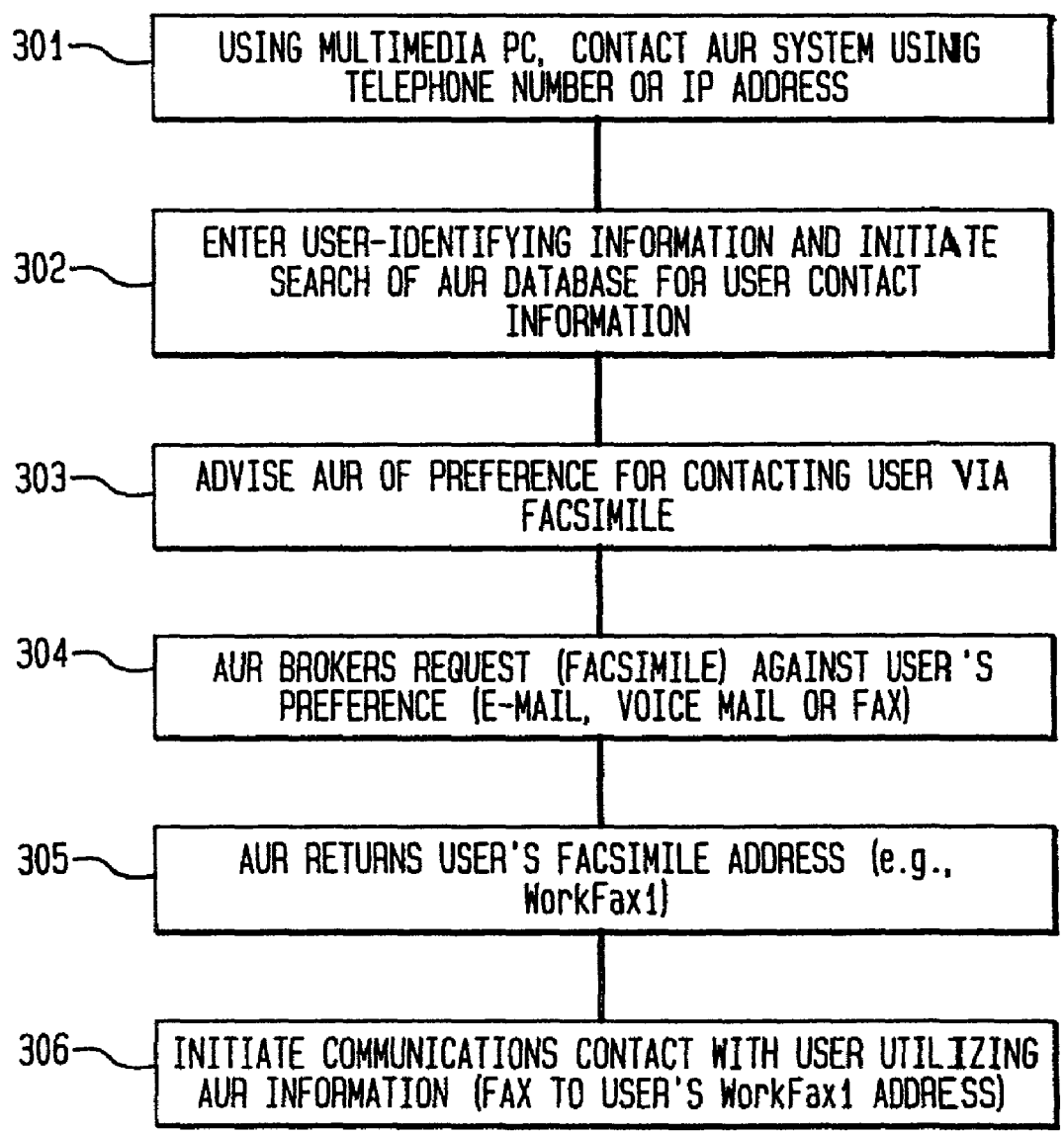

ACTIVE USER REGISTRY

This application is a continuation of application Ser. No. 08/823,944 filed Mar. 25, 1997, now U.S. Pat. No. 6,546,005 by the same inventive entity of the instant application, and claiming the benefit of filing-date priority thereof.

TECHNICAL FIELD

This invention relates to communications in general and, more particularly, to a way of facilitating communication with individuals reachable over a variety of communications options.

BACKGROUND OF THE INVENTION

The Plain Old Telephone Service (POTS) network, which has been in existence for over 100 years, is well designed and well engineered for the transmission and switching of 3 kHz voice calls. The POTS network is a real-time, low-latency, high reliability, moderate fidelity voice telephony network. It is not designed for, nor especially well suited to, other forms of communications, including wideband speech, audio, images, video, fax and data. The POTS network is inherently "telephone" or "handset" oriented and is driven by the needs of real-time voice telephony.

There are approximately 270 million users of the POTS network in the United States, making POTS access nearly ubiquitous throughout the U.S. On the other hand, the POTS network has high access costs and, for international calls, settlement costs.

Packet networks are general-purpose data networks which are not tied to fixed-bandwidth circuits. Instead, they are designed to transmit bits (in the form of a packet of fixed or variable length) only when there are bits to transmit. Packet networks evolved independently of telephone networks for the purpose of moving bursty, non-real-time data among computers and are distinguished by the property that packet communications are routed by address information contained in the data stream itself.

Packet networks are especially well suited for sending stored data of various types, including messages, fax, speech, audio, video and still images, but are not well suited for sending real-time communication signals such as real-time speech, audio, and video signals. Typically, one accesses a packet network through a client program executing on a personal computer (PC), and so packet networks are inherently "PC" oriented, and client/server driven. Packet networks provide access to distributed databases and have excellent search capabilities.

There are approximately 30 million users of packet networks in the U.S.; the number of users is growing rapidly and will continue to do so over the next decade. Today, the Internet (the largest and most renowned of the existing packet networks) connects over 4 million computers in some 140 countries. The Internet is implemented using a large variety of connections between those millions of computers. These interconnected computers can support applications, such as electronic mail and the World Wide Web, which facilitate communications between persons across the U.S. or around the globe.

The Internet's global and exponential growth is common knowledge today. The recent developments on the World Wide Web interfaces and information navigation software, such as a multitude of Web browsers, coupled with a continuously growing number of public access providers, are making the Internet a fundamental component of the information age, if not the information super highway itself.

Several alternate forms of communication have developed which utilize either the POTS network or packet networks (and sometimes both). For example, facsimile (fax) communication is now a commonplace option for transmitting copies of documents over the POTS network. Electronic messaging (e.g., e-mail) is a growing phenomenon for those who use a packet network, particularly the Internet, for communications. In addition, many companies today are using packet networks, locally or internally within the company, which are modeled in functionality based upon the Internet. These packet networks, denoted "intranets," are typically private networks owned or controlled by the company or corporate user. Intranets are compatible with the Internet Protocol (IP), and often the same software used in connection with the Internet (e.g., Web browsers) is also used in connection with intranets. Intranet networks are often established to connect to the Internet through a firewall (i.e., a hardware/software combination designed to restrict unauthorized access to the intranet from the outside world).

A World Wide Web site on the Internet typically resides on a computer known as a server, which is accessed through the Internet by a person utilizing a computer, such as a PC. A Web site consists of one or more Web pages comprising scripts written in Hyper Text Markup Language (HTML) and typically resides on a server compatible with HyperText Transport Protocol (HTTP, a protocol for interfacing with the Internet). Pages at a Web site are typically accessible and viewed by the person using the PC through software called a Web browser, which typically resides on the person's PC. A Web browser, such as the one by Netscape, interprets Web page HTML scripts to provide a graphical user interface that allows easy access to various services over the Internet. Equivalently, Web sites internal to and locatable over a corporate intranet may be set up and accessed in a like manner using the same or virtually the same software (e.g., a Web browser). Such Web sites internal to a corporate intranet are typically HTTP compatible and addressable using URL techniques, and contain Web pages comprising HTML scripts.

Persons may browse the World Wide Web for virtually any kind of information, including information having content derived from one or more media, such as words, sounds or images. Increasingly, businesses are establishing Web sites as a means of providing information to and attracting potential customers, and Web sites are emerging as a means of transacting business. One may locate a company's Web site by, e.g., using one of a number of existing search engines available over the Internet, or browsing other Web sites containing links to the company's Web site, or entering directly the Uniform Resource Locator (URL), which represents an address for the Web site. Typically, Web browsing takes place in the context of an interactive communication session, where one may, for example, direct the Web browsing session by choosing to follow hypertext links found in Web sites and/or may respond to information located at various Web sites.

An Internet-related development is packet telephony. Packet telephony involves the use of a packet network, such as the Internet, for telecommunicating voice, pictures, moving images and multimedia (e.g., voice and pictures) content. Instead of a pair of telephones connected by switched telephone lines, however, packet telephony typically involves the use of a "packet phone" or "Internet phone" at one or both ends of the telephony link, with the information transferred over a packet network using packet switching techniques. Intranets can also be used to provide electronic messaging as well as other packet-type functionality.

These communications options mentioned above provide, along with regular POTS telephony, alternate paths for communicating between individuals and groups. A computer, such as a PC, is commonly used to provide output for display of a Web page or other multimedia content to a person using it, for example through a video display and accompanying hardware for playing audio. Such output may take the form of at least one of textual, graphic, animation, video, audio, or virtual object media. The computer or PC is also commonly capable of accepting input from the person using it; such input may be provided by means such as a keyboard, a mouse, a telephone touch pad, a television remote control, a microphone, a MIDI port and so on.

As the concept of communications between individuals and groups changes over time, and further with the inclusion of messaging capability, image and video telephony, handwriting transmission, and the integration of voice, other audio, image, video, handwriting, and data, it becomes essential to provide some easy-to-use and convenient mechanism to link people together who want to communicate with each other. To illustrate the complexity of the task, consider trying to communicate with someone having the following ways of being reached:

- home telephones (often there are two or more lines in a private residence)
- work telephones (generally people can be reached via at least one work POTS number and a secretarial pickup)
- cellular telephone (about 15% of the population can be reached via a cellular telephone)
- video telephone (e.g. Vistium system or Picturetel system)
- pager/beeper (through either appropriate software or via 800 number services, individuals can receive ASCII messages or numeric phone numbers to dial)
- voice mail systems (most businesses provide voice mail (voice messaging) for use when there is no secretarial pickup or for calls that come in out of normal business hours)
- video mail system (this is a feature that will start to be provided as videophones and Vistium-like systems start to proliferate)
- e-mail systems (individuals often have two or more e-mail addresses—e.g. Unix e-mail, ATT Mail, Lotus Notes e-mail, Internet e-mail, or intra-corporate e-mail)
- home answering machines (most private homes use telephone answering machines to record messages when away from home, or when the phones are turned off; also there is some use of network voice mail services)
- IP (Internet Protocol) addresses (which may be static when a person is attached via a Local Area Network (LAN) connected to a corporate network, or which may be dynamic when a person is attached via a modem connection to an Internet service provider, such as AT & T WorldNet™ Services); this type of connection is also used for collaborative work systems with shared workspaces, e.g. Vistium Share
- business FAX number (associated with either the individual or the workgroup within the office environment)
- home FAX number (associated with a hardware FAX machine at home, or with a FAX/Modem on a home PC)
- paper mail (distributed electronically to e-mail addresses via services such as POST)
- home page (individuals and businesses may have a home page associated with a Web site, e.g., locatable over the World Wide Web using a URL address)

As one can see from the above list, any individual trying to reach another individual has to deal with the daunting problem of knowing which ones of all of these options of reaching a person are in fact practical options for reaching that person, of determining the applicable communications number or other communications address for such available communications options and, in addition, making a decision as to which is the appropriate option to use taking into account the time and the purpose of the communication. Often this is a difficult—or an unsolvable—problem. For example, consider how one would determine the active (e.g., via modem) or passive (e.g., via a LAN) IP address of an individual connected to a data network, as would be needed for direct real-time IP-addressable messaging; on the other hand, messages may be sent to one's packet network address in non-real time via currently-available e-mail techniques and, thus may be a preferable option for packet messaging when an active IP address is unavailable. Other problems include the physical difficulty of making the desired type of communications connection which would render that mode of communication impractical for the desired purpose (e.g., if it was desired to send a voice message without disturbing the addressee, how could you connect to a home answering machine without the phone ringing and being picked up by the owner?; if such a capability is not available, another communications option may be preferable).

What is desired is a way of easily determining what communications options are available for contacting an individual at the time and for the purpose of the communication and, additionally, the appropriate communications number (or address) for such communication contact.

SUMMARY OF THE INVENTION

The present invention is directed to a system for creating and using an Active User Registry (AUR). The Active User Registry system comprises a database and computer or processor and is integrated with the POTS network and a packet network (such as the Internet, or a corporate intranet). Integrating AUR with the POTS network and a packet network exploits the outstanding strengths of both of its constituents, such as the low-latency, high reliability, moderate fidelity real-time voice telephony provided by the POTS network, and the point-and-click access to distributed databases with excellent search capabilities provided by a packet network, such as the Internet (including those made available using browser technology in conjunction with the World Wide Web).

The AUR database contains a dynamic data structure (such as a linked list or a hashed table) of various ways in which one or more users can be reached via some type of communication network (e.g., through the POTS network or a packet network, or both), including access via the Web. A key feature of the AUR is the ability to broker between a subscriber's request for communications contact information corresponding to a user and the user's preferences of being reached by various communications alternatives. Other features may be included with the AUR, including an AUR cache which provides subscribers with rapid-access entry points into the AUR, or automatic updating of user contact information. Further, the capability of learning the user's preferences is included as an additional feature and is also included as a feature in an alternative embodiment of the present invention.

BRIEF DESCRIPTION OF THE DRAWINGS

FIG. 2 shows a representative arrangement of data elements in accordance with the present invention.

FIGS. 3A, 3B and 3C show diagrams for accessing an Active User Registry system in accordance with the present invention.

DETAILED DESCRIPTION

In accordance with the present invention, an Active User Registry (AUR) system is defined which, in its most basic form, comprises a computer and a database and which is integrated with the POTS network and a packet network (such as the Internet, or a corporate intranet). Integrating the AUR system with the POTS network and a packet network exploits the outstanding strengths of both of its constituents, such as the low-latency, high reliability, moderate fidelity real-time voice telephony provided by the POTS network, and the point-and-click access to distributed databases with excellent search capabilities provided by a packet network, such as the Internet (including those made available using browser technology in conjunction with the World Wide Web).

The Active User Registry database contains a dynamic data structure (such as a linked list or a hashed table) of all the ways in which one or more individual or entity users can be reached via some type of communication network (e.g., through the POTS network or a packet network, or both). The term "user" herein refers to an individual or entity reachable through one or more communications options (such as, e.g., telephone over the POTS network, e-mail, fax, etc.); the term "subscriber" herein refers to an individual or entity seeking to establish communications contact with and/or send a message to a user. In standard telephony parlance, the "user" is often referred to as the "called party," and the "subscriber" is often referred to as the "calling party." A key feature of the AUR system is the ability to broker the user's and subscriber's preferences of reaching the user by various communications alternatives. Other features may be layered on top of this most basic form of the AUR. For example, an AUR cache may be provided to subscribers which provides rapid-access entry points into the AUR for those users that a subscriber may regularly attempt to contact; the AUR may include automatic updating of user contact information; or the AUR system may learn the preferences of users regarding who may reach them by the various communications alternatives. Further, the AUR will enable customers to easily invoke enhancements to POTS services such as messaging and mobility, by using point-and-click interfaces on their PCs to open up a range of services that is broader than that enabled by a simple telephone interface. Additionally, persons having only a telephone could gain access to information from databases, formerly available only on the packet network though emerging text-to-speech and voice recognition network interfaces. Moreover, new services combining the simultaneous delivery of multimedia content to a PC and real-time communications (e.g. voice, audio, video) over a telephone become possible.

Figure 1:
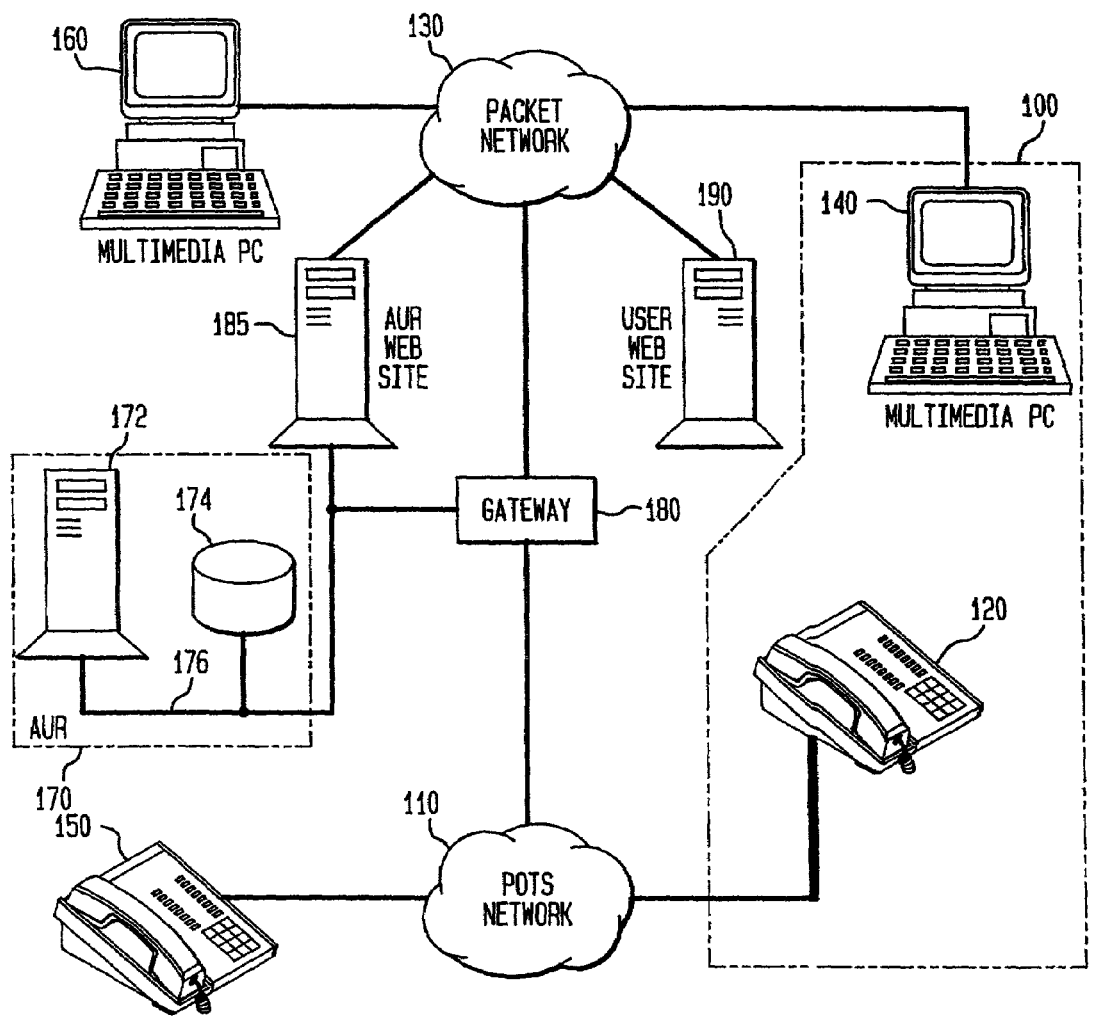
FIG. 1 is a diagram showing an embodiment of an Active User Registry system in accordance with the present invention.

With reference to FIG. 1, the present invention will now be described in more detail. As shown in FIG. 1, a typical user 100 (one of many such possible users) is linked to POTS network 110 through telephone 120 such that user 100 may be contacted by telephoning the number corresponding to telephone 120. The typical user 100 may also be linked to packet network 130 (which may be, e.g., the Internet) through a PC, e.g., multimedia PC 140 as shown in FIG. 1. A multimedia PC enables a user to interact with information over the packet network in many forms, such as, e.g., data, voice, images, and video. Multimedia PC 140 may be linked to packet network 130 using any one of a number of known methods, e.g., modem, ISDN, etc.

A subscriber who seeks to utilize the present invention may be linked to POTS network 110 through telephone 150 or, alternatively, the subscriber may be linked to packet network 130 through a PC, such as multimedia PC 160, using one of a number of known methods. A typical subscriber may be linked both to POTS network 110 (through telephone 150) and to packet network 130 (through multimedia PC 160).

The Active User Registry system 170 is integrated with the POTS network 110 and a packet network 130 through gateway 180. Gateway 180 acts as an interface between AUR 170 and each of POTS network 110 and packet network 130, to permit a subscriber to access AUR available information through either the POTS network or the packet network. Those skilled in the art will recognize that the advantages of the present invention integrating AUR 170 with packet network 130 and POTS network 110 could be achieved where the packet network includes the Internet, an intranet, or both. Those skilled in the art will further recognize that the advantages of the present invention could be achieved by integrating AUR 170 with packet network 130 (which could include the Internet, an intranet, or both) and a private telephone network (such as an intra-corporate telephone network) served by a private branch exchange (PBX).

Web access to the AUR system may be accomplished through an optional AUR Web site hosted on AUR Web site host server 185, which is a typical Web site host server known to those skilled in the art. AUR Web site host server 185 may, e.g., be coupled to the AUR system through gateway server 180 or, alternatively, AUR Web site host server 185 may be coupled directly to the AUR system.

A URL-addressable Web site or home page corresponding to the user may be hosted on user Web site host server 190. User Web site host server 190 may be one of any number of typical servers commonly used for hosting one or more Web sites. Host server 190 may be privately owned by the user or, alternatively, a Web site (or home page) corresponding to a user may be hosted on, e.g., a host server 190 that is provided by an Internet service provider, such as AT & T WorldNet™ Services.

Active User Registry system 170 is comprised of a computer 172 and a database 174. Computer 172 may be any one of the known computers, such as a PC, or a server, or even a processor; computer 172 may also be comprised of communications equipment having a computer built in, or integrated, into the system. For example, the AUR system of the present invention may be implemented on an adjunct platform known to those in the art, such as the Conversant® Voice Information system produced by Lucent Technologies.

AUR database 174 is coupled to AUR computer 172 through communications link 176, which may be accomplished through one of many known methods for linking a computer to a database, such as, e.g., a bus, or a LAN, or another communications network. As shown in FIG. 1, communications link 176 may also provide the link coupling AUR 170 to gateway 180; those skilled in the art, however, will recognize that another communications link may be used to couple AUR 170 to gateway 180. AUR database 174 stores information about the networks as well as information about users, including phone numbers, FAX numbers, mobile numbers, e-mail addresses, URLs, etc. In its simplest form, AUR database 174 is a dynamic data structure (such as a linked list or a hashed table) of all the ways in which an individual or entity user can be reached via some type of communication network.

Typically, the user will be identified by name and address, where the address would be used to resolve ambiguities between coexisting names (e.g., John Smith). Where the user is an entity, the identifier could be the name of the entity (e.g., a company name).

Alternatively, the AUR system permits access of the AUR database by occupation or title of the user, rather than by the individual user's name or identifier. For example, the AUR system may be used to contact, e.g., the guard at the main reception for a particular business or organization, or to contact the head of Security for the business or organization. To accomplish this, the AUR database would include with certain usernames (this may, but would not have to, include all users in the AUR database) one or more functional descriptions of the activity of work, e.g. job title, cross-references to job occupation, etc. as well as the name of the employer. In the case of an entity as the user, the "occupation" could include a reference to the type of business in which the entity is engaged (e.g., clothing retailer).

For a typical user, the entries in the AUR database 174 might include the following:

---

Username; UserAlias1; UserAlias2; ...;
HomePhone1; HomePhone2; WorkPhone;
WorkSecretary; CellularPhone1; VideoPhone;
...; WorkVoiceMessages; HomeAnsweringMachine;
VideoMailMessages; BeeperNumber1; ...; Email1;
Email2; ...; WorkFAX1; WorkFAX2; HomeFAX; ...;
LAN IP; ModemIP; ...; URL1; URL2; ...;
Multimedia1; Multimedia2; ...; ReachNumber

---

The AUR database consists of a series of user records, each user record containing one or more of the entries listed above. One possible arrangement of the AUR database is shown in FIG. 2. With reference to FIG. 2, the AUR database as depicted consists of N user records, record 201 corresponding to user 1, record 202 corresponding to user 2, record 203 corresponding to user 3, and so forth. Each user record in the AUR database contains entries for the above-listed user communications contact information. Thus, as shown in the example of FIG. 2, record 201 corresponding to user 1 consists of a set of entries 210, 220, 230, 240, 250, 260, 270, 280 and 290, each corresponding to a different category with each entry potentially consisting of one or more information data elements.

The corresponding function of these entries in the user record will now be described. The data elements in entry category 210 correspond to identifier information. Username represents the formal name of the user to whom the listed information corresponds (similar to a name listed in a telephone directory), and could typically include further identifying information such as home street address, home city or town, and/or employer name and location; such further identifying information would be useful in resolving ambiguities that may occur in locating the desired user record in the AUR database (e.g., which Jane Smith). UserAlias1, UserAlias2, etc. represents other names (such as nicknames or initials) by which the user is known. In addition, the data in entry category 210 could include identifying information, such as a picture, a handwritten signature, fingerprints, etc.

The data elements (HomePhone1, HomePhone2, WorkPhone, WorkSecretary, and CellularPhone1) in entry category 220 represent the various home, work, cellular (or portable) telephone numbers by which the user may normally be reached (the ability to reach a user by one or more of these numbers may be subject to the user's preferences, as discussed below). The VideoPhone data element of entry category 220 would represent the communications number or address for contacting the user via a videophone device. The data elements WorkVoiceMessages, HomeAnsweringMachine, VideoMailMessages, and BeeperNumber1 of entry category 230 would represent the number or address for the various telephonic or videophonic means for leaving a voice (or video) message for the user, or for requesting the user to make a telephone or videophone call.

There are entries as well corresponding to electronic or digital messaging. Entry category 240 contains data elements Email1 and Email2 representing e-mail addresses for the user. WorkFAX1, WorkFAX2, and HomeFAX are data elements in entry category 250 representing the various facsimile numbers for transmitting facsimile messages to the user at work or at home. Entry category 260 contains data elements LAN IP and ModemIP representing the IP addresses by which the user may be reached via a packet network for carrying out real-time IP messaging (e.g., to connect the user in an Internet phone call).

Category 270 contains data elements corresponding to URLs for accessing a user's Web site, home page (or HTML page) using a browser. Thus, a subscriber accessing the AUR system may, once in the AUR database, click to enter the Web page for the user, and thereby become directly connected to the user's personal or business home page (or another entry Web page) if accessing the AUR from an Internet Browser.

Further, as reflected by entry category 280, the AUR database may include addresses (such as URL or IP) to multimedia information about the user, e.g. textual documents such as biographies, resumes, etc; pictures of them, their families, or other events of their choice; video clips of them, their families, or other events of their choice; audio clips of special or general purpose interest, etc. When such multimedia information is accessed via an Internet browser (i.e. a Web browser or equivalent), the user could click to access the desired text document, picture, video, or audio clip. Every user record could easily have an associated Portrait Picture of the individual and perhaps his/her family, as well as any other important personal information that might be desired—e.g. resume, bibliography, personal information, etc. Optionally, personal identifying information, such as biographical and family information or pictures or video clips listed above in connection with element 280, may be included under entry category 210.

Entry category 290 consists of data element ReachNumber, which represents a telephone or other communications number by which the user may be currently reached by direct contact. ReachNumber 290 may, for example, be one of the above-referenced numbers (e.g. HomePhone1, CellularPhone1 or VideoPhone) or a temporary number (e.g., a telephone number for a hotel in which the user stays during business travel, or the number for a business associate hosting a meeting with the user).

Those skilled in the art will recognize that each of the entries described above corresponds to a user communications address for the particular communications option; for example, an address for reaching a user by telephone is one of the given telephone numbers (e.g., HomePhone1, HomePhone2, etc.), and an address for reaching a user by e-mail is one of the e-mail addresses (e.g., Email1, Email2). It should be clear to those skilled in the art that the specific entries and data elements described with reference to FIG. 2 are provided as a representative example only and are not intended to be limiting; any one of the almost infinite number of possible combinations of entries, elements and their organization can be utilized within the AUR database without detracting from the advantages of the present invention.

One key feature of the AUR is the ability to broker among communications options between, on the one hand, the user's preferences for being contacted or communicated with by others and, on the other hand, the subscriber's requested preference for making contact or otherwise communicating with the user, taking into account such factors as the time, the day, the identity of the person requesting the information or the purpose of the communication. In accordance with the present invention, the AUR database 174 may contain one or more lists of preferred communications options, for a given user, by which the user desires to be contacted. These preferred options may include, e.g., preferences for being contacted according to time-of-day or day-of-week, to preferences based upon the identity of the subscriber who is attempting to communicate with the user. These preferences may even include those based upon linking the AUR to a source of information for the user's schedule, such as, e.g., the user's personal information manager or personal digital assistant (such devices or sources, and any similar devices or sources, will be collectively referred to herein as a "personal information source"), such that the preferences (and the contact information) would change automatically depending upon the user's schedule as obtained from the user's personal information source. The AUR may be linked to a user's personal information source over, e.g., a communications network.

As an illustration, a user could have one set of preferences selected for the time slot 6:30 am to 7:15 am, another set of preferences for the time slot 7:15 am to 7:30 am, another set of preferences for the time slot 7:30 am to 6:00 pm, another set of preferences for the time slot 6:00 pm to 6:15 pm, another set of preferences for the time slot 6:15 pm to 11:00 pm, another set of preferences for the time slot 11:00 pm to 11:30 pm, and a last set of preferences for the 11:30 pm to 6:30 am time slot. These time slots might roughly correspond to the workday schedule:

6:30 am, wake up
7:15 am, leave for work
7:30 am, arrive at the office
6:00 pm, leave for home
6:15 pm, arrive home
11:00 pm, get ready to go to sleep
11:30 pm, go to sleep A complementary sequencing of preferences during time slots could be arranged for weekends when one doesn't go to work, as well as for vacations, etc. The ability to dynamically change the list of preferences permits the user's preferences to keep up with individual schedules, change of work assignments, vacations, trips, etc. The user's preferred communications options, thus, may include different ways of being contacted for each of these time slots.

Additionally, the user may establish preferences for being contacted which depend on who is trying to reach the user. Hence, for example, when a member of the user's family is attempting to contact the user, there could be a user preference that always chooses a phone where someone is available to answer the phone, whereas if a salesperson or work colleague is calling, there would be another preference where the user would be disturbed by telephone far less often.

Figure 3B:
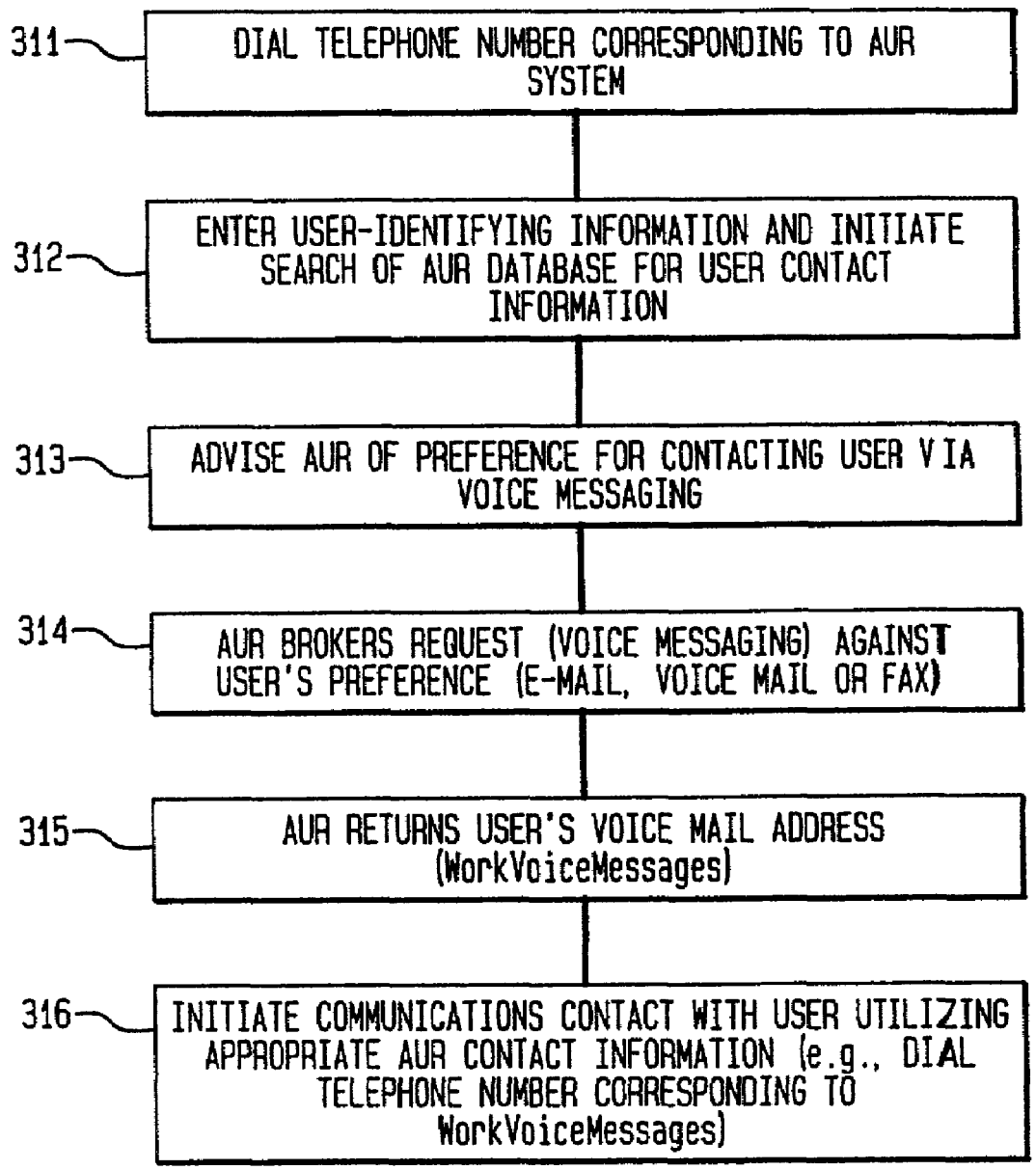
Figure 3C:
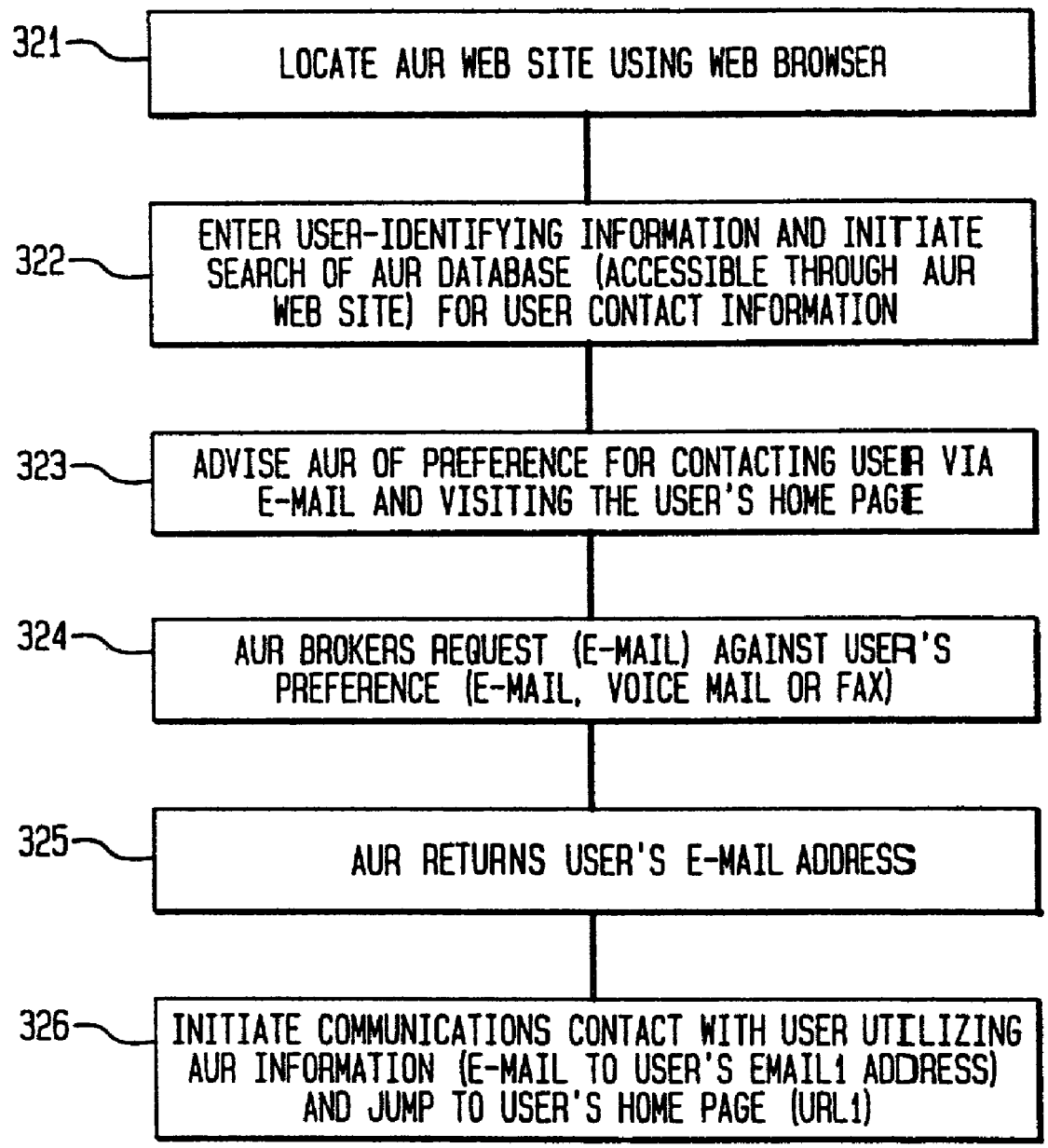

In light of these potential types of user preferred communications options, the brokering process utilized by the AUR system of the present invention will now be described through the following examples. These examples are meant to be illustrative of the process of the present invention and are not intended to be limiting. With reference to FIGS. 3A, 3B and 3C as an illustration of the brokering process, assume a user at work has established a preferred option, such that during the afternoon work time only a family member may reach the user directly by telephone, and that all other communications are to be made by messaging (such as voice mail, e-mail or fax). In the example shown in FIG. 3A, a non-family member subscriber attempting to contact the user at work prefers to leave an e-mail message for the user, as opposed to voice mail or other electronic message.

The subscriber in this example initiates at step 301 a contact to the AUR system using multimedia PC 160 (shown in FIG. 1) by, e.g., using a modem to connect or to dial in to a site corresponding to AUR system 170 (shown in FIG. 1) or, alternatively, by sending a message to an IP address corresponding to the AUR system. The AUR system responds by presenting an access menu to the subscriber. Using a text-based search tool (text-based search tools are known to those in the art), the subscriber at step 302 enters a user identifier, such as information corresponding to the identity of the user (e.g., the user's name) and initiates, though the AUR system, a search of the AUR database for the user of interest to the subscriber. The subscriber at step 303 requests the AUR system to provide a communications number for sending a facsimile message for the user (this could be done, e.g., by typing the information in or by speaking into a microphone contained within the PC). The AUR system at step 304 compares the subscriber's request (facsimile message) against the user's preferred options (e-mail, voice mail or fax from a non-family member during the afternoon). The AUR system selects facsimile messaging (in this example, facsimile messaging is common to both user and subscriber preferences) and provides, at step 305, a facsimile address for the user (e.g., WorkFax1) to the subscriber. The subscriber then at step 306 initiates a communications contact with the user at the WorkFax1 address. Alternatively, the AUR system could ask the subscriber for a message or a filename of a document to be faxed and send it electronically to the user without the need to ever pass along the user's fax number to the subscriber. In this manner, the AUR provides a seamless interface to the brokered communications service without the need for the subscriber to know or to enter any user numbers.

Similarly, in the example shown in FIG. 3B, the non-family member subscriber at step 311 initiates a contact to the AUR system using telephone 150 (shown in FIG. 1) by, for example, dialing a telephone number corresponding to AUR system 170 (such as, e.g., dialing 1-800-CALLATT and requesting the AUR system or alternatively, requesting the AUR cache). At step 312, the subscriber then enters a user identifier, such as username, by, e.g., speaking the name or pushing buttons on the telephone keypad corresponding to the letters of the user's name which initiates, through the AUR system, a search in the AUR database. By speech or by keypad, the subscriber enters a request for contacting the user by leaving a voice message at step 313. The AUR system at step 314 compares the subscriber's request (voice messaging) against the user's preferred options (e-mail, voice mail or fax from a non-family member during the afternoon) and, at step 315, returns the user's voice mail address (WorkVoiceMessages) to the subscriber (e.g., by speaking over the telephone the address obtained from the AUR database). Then at step 316 the subscriber initiates a communications contact using the appropriate communications number or address obtained from the AUR database, in this example, by dialing the telephone number corresponding to the user's voice mail (WorkVoiceMessages). Alternatively, the AUR system could ask the subscriber to record a voice message and then send it automatically to the user's WorkVoiceMessages address without the need to ever pass along the user's voice mail number to the subscriber. As in the previousd example, in this way the AUR provides a seamless interface to the brokered communications service without the need for the subscriber to know or to enter any user numbers.

In the example depicted in FIG. 3C, the subscriber initiates at step 321 a contact to the AUR system using multimedia PC 160 (shown in FIG. 1) by, e.g., using a Web browser to access an AUR Web site (via, e.g., AUR Web site host server 185) corresponding to AUR system 170. Through the Web site, the AUR system presents a Web page having an access menu to the subscriber. Using a search tool available through the AUR Web site (there are many known Web-based search tools), the subscriber at step 322 enters a user identifier and initiates through the AUR system a search of the AUR database for the user of interest to the subscriber. The subscriber at step 323 requests the AUR system to provide a URL for visiting the user's home page and then leaving an e-mail message for the user. The AUR system at step 324 compares the subscriber's request (URL address and e-mail message) against the user's preference (e-mail, voice mail or fax). The AUR system selects e-mail (in this example, e-mail is common to both user and subscriber preferences) and provides, at step 325, an e-mail address for the user (e.g., Email1) to the subscriber; because the subscriber desired to visit the user's home page, the AUR Web site also provides a link for jumping to the user's home page. The subscriber then at step 326 can initiate an e-mail message to the user at the user's e-mail address (Email1), and then the subscriber can jump to the user's home page on the World Wide Web (as hosted on user host server 190, shown in FIG. 1) or an equivalent to a home page on an intranet, typically by clicking on a reference to a URL-compatible address for the user's home page (e.g., URL1) provided by the AUR system. Alternatively, the AUR system could ask the subscriber for the text of, or filename for, a message to be sent and send it electronically to the user without the need to ever pass along the user's e-mail address to the subscriber. In this manner, the AUR provides a seamless interface to the brokered communications service without the need for the subscriber to know or to enter any user addresses.

Additional capabilities may be included with the brokering process described in the above examples. For example, the brokering process can compare the user's preferred communications options against the subscriber's request and, if there is not a direct match, determine a communications option having at least one communications property in common with both the user's preferred communications options and with the requested communications option (i.e., choose an option having a common denominator between the two) based upon a hierarchy of available and desired communications options. A hierarchy of communications options may be constructed based upon the relative ease or difficulty in establishing contact with the user. For example, communications options such as e-mail or fax are near one end of the hierarchy, since they represent options by which it is fairly easy to establish contact with a user. All one need do is direct a message to a known e-mail or facsimile address, and the e-mail or facsimile process normally takes care of "delivering" the message to the user, with the user having little chance to "filter" out the message. At the other end of the hierarchy is direct voice contact, such as by a telephone call, which requires not only knowledge of the user's telephone number but also that the user actually pick up the telephone and respond to the call. At this end of the hierarchy, the user has substantial capability of "filtering" to avoid the contact—e.g., in the case of a telephone call, by not answering the call or by hanging up without carrying on the conversation desired by ther caller. In between these extremes of the hierarchy lie other communications options, such as voice messaging (e.g., voice mail), in which the user may have limited degree of "filtering" capability.

Using such a hierarchy could allow the subscriber to request a range of options and/or for the user to select a range of preferred communications options. For example, if the subscriber requests contact with a party using a telephone connection (with highest preference being direct voice contact, but voice messaging is acceptable), and the user, on the other hand, prefers to be contacted via messaging (with highest preference to receiving an e-mail message, with other forms of indirect messaging acceptable, but not direct voice contact), the AUR system can broker the request by determining the lowest common denominator—in this example, voice messaging—and, assuming the voice messaging mode is acceptable to both the user and subscriber (i.e., voice messaging is within the hierarchy of acceptable communications options for the subscriber and the user), the AUR can offer the user's WorkVoiceMessages (or HomeAnsweringMachine) communications address to the subscriber.

Alternatively, the brokering process of the present invention can be accomplished by performing an intelligent comparison between the user's preferred communications options and the subscriber's request, and then initiating a conversion (or, equivalently, a translation) of a message from one message media corresponding to the subscriber's request to another message media required by the user's preferred communications options. Such an intelligent brokering process may be particularly useful when the communications options available to a subscriber or a user are limited in some manner (e.g., the user may be temporarily unable to receive a voice message, while voice messaging may the only practical option available at that time to the subscriber).

Thus, for example, if the subscriber requests to send a fax to the user, but the user prefers to receive an e-mail message, the AUR system could broker these options such that the subscriber sends the fax through the AUR system (by, e.g., giving the subscriber a fax address that corresponds to a communications address associated with the AUR system), which would then convert the text portions of the fax transmission into an electronic message to be sent as e-mail to the user via the user's preferred e-mail address contained in the AUR database. Methods for converting text portions of a facsimile transmission into electronic messages, e.g. using optical character recognition (OCR) techniques, are well-known to those skilled in the art. Alternatively, a layered version of a fax transmission (text plus other visual or graphical material) may be converted into an equivalent electronic form for sending as an electronic message.

As another example, if the subscriber requests to send a voice message, and the user prefers to receive e-mail, the AUR system could accept the voice message from the subscriber, convert the voice message to an electronic message using one of a number of known voice-to-text conversion techniques (using large vocabulary speech recognition capability, as is well understood in the art), and send the resulting message to the user via e-mail. Other examples of conversion that are possible with the intelligent brokering process described herein include e-mail to voice messaging; e-mail to fax; voice to fax, and so on. These examples are not intended to be limiting, but instead demonstrate the capability of the brokering process to resolve what would otherwise appear to be "conflicts" between a subscriber's request and a user's preferences and achieve a desired result—providing a way for a subscriber to communicate with a user in accordance with the subscriber's request and the user's preferred options.

The AUR system can be made easier to use by providing a voice interface that is responsive to and initiates voice commands enabling interaction with, and control and management of, the AUR database from any available voice-compatible communication interface. A voice interface can be implemented using voice recognition techniques and speech recognition techniques known to those skilled in the art. For example, a platform such as the Lucent Conversant® Voice Information System would also include sufficient capabilities for implementing a voice interface.

As a further enhancement, the AUR system could, as referred to above in the examples, automatically initiate the communications indicated from the AUR database, such that, for example, a telephone call could automatically be dialed (e.g., in response to a voice command or click-to-dial) or an e-mail message automatically addressed, or a link to a URL address automatically initiated using a Web browser. This would permit, e.g., contact by a subscriber (otherwise within the user's preferred list) to a user having an "unlisted" communications address (i.e., the address is not available in a published directory). Those skilled in the art will recognize that use of any number of communications options indicated to the subscriber through the AUR system could be automatically initiated in accordance with the features of the present invention.

An alternative embodiment of the present invention will now be described with reference to FIGS. 4 and 5, which contain diagrams showing a user linked to the POTS network and a packet network based upon the configuration depicted in FIG. 1 and described above. For ease of understanding, the items shown in FIGS. 4 and 5 having reference numbers beginning with "1" correspond to the same numbered items as shown in FIG. 1. The alternative embodiments shown in FIGS. 4 and 5 will now be described with respect to the differences from the embodiment shown in FIG. 1.

Figure 4:
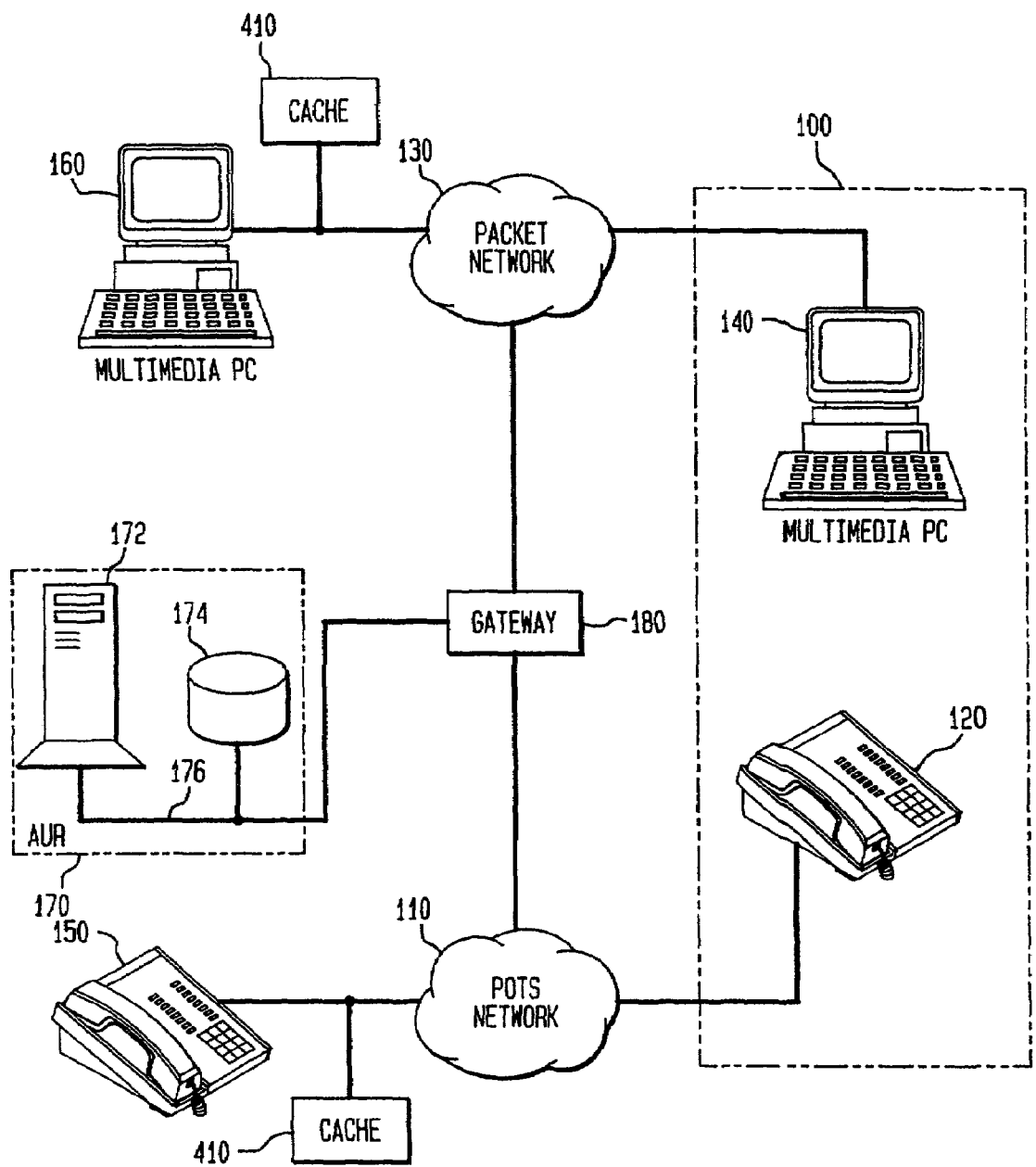
FIGS. 4 and 5 are diagrams showing alternative embodiments of an Active User Registry system in accordance with the present invention.

FIG. 4 shows two instances of AUR cache 410, which comprises memory containing data storage for one or more subscribers. AUR cache 410 is linked to a subscriber's telephone 150 via, e.g., a connection between the subscriber's telephone line and the AUR cache; alternatively, AUR cache 410 may be linked to a subscriber's multimedia PC 160 through, e.g., a connection between the AUR cache and the communications line through which the multimedia PC is linked to the packet network, or even through a device contained with the multimedia PC.

The data stored in AUR cache 410 for each subscriber includes a dynamic data structure (such as a linked list or a hashed table) comprising usernames and aliases which correspond to one or more users that the subscriber attempts to contact on a more than infrequent basis. For example, the AUR cache could automatically update a subscriber's record with information corresponding to a particular user that the subscriber calls once a week. Each entry in the subscriber's record would also include, for each user, data representing an entry point (e.g., a pointer) into the corresponding user record in the AUR. The subscriber could look up the user's username or user alias in the AUR cache, which would provide a pointer to the user's record in the AUR database. One advantage of the AUR cache is that it would enable a particular subscriber to resolve conflicts or ambiguities in the access to the AUR database and the pointer into the corresponding AUR record could then be stored in the AUR cache, saving the subscriber the effort of resolving that choice for each subsequent use of the AUR. For example, if the subscriber wishes to communicate with John Smith, the subscriber could tell the AUR which "John Smith" is desired, and the pointer to the record in the AUR database for that John Smith could be stored in the AUR cache for the next time the subscriber seeks to contact John Smith. In this way, the subscriber has available via the AUR cache rapid-access entry points into the AUR database for those users contacted on a more than infrequent basis. This also provides a way for convenient voice access into the AUR database without the subscriber having to resolve name ambiguities (or otherwise recognize a name) every time the subscriber attempts to access a particular user.

Another advantage of providing an AUR cache containing pointers into the AUR database is that the communications contact information in the AUR which is accessed through the AUR cache remains as current as the AUR database itself; each time the AUR database is updated (e.g., through changes by the user or through changes made by the network) those updates become available to the subscriber who uses the AUR cache through the use by the cache of pointers into the AUR database.

Because the amount of information required for each user entry in a subscriber's record is minimal, AUR cache 410 could be implemented in one of a number of known ways to store small amounts of data, e.g., a card with a magnetic stripe, which would correspond to an AUR cache for a single subscriber or, possibly, for a small number of subscribers (e.g., a subscribing family could have individual records for each family member all contained on a single card). As an alternative, the subscriber record or records associated with the AUR cache could be maintained in memory commonly used with a PC, e.g., a hard disk or a removable disk, or on any computer-readable medium. In another alternative, an AUR cache for a larger number of subscribers could be maintained on a local network, such as a LAN or in a central telephone office serving the community in which the subscribers are located.

Figure 5:
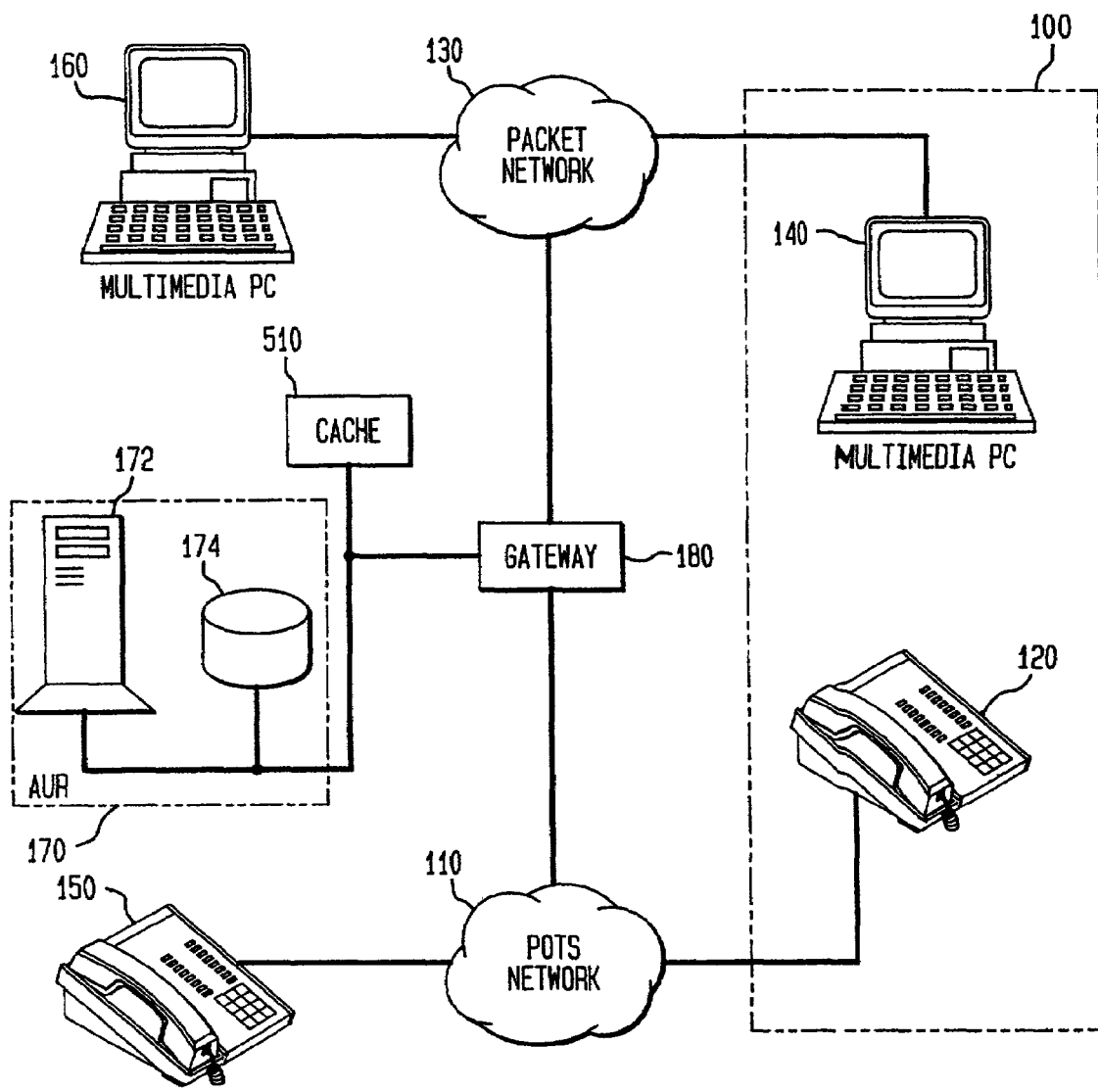

FIG. 5 shows AUR cache 510 linked to gateway 180. AUR cache 510 contains data storage for one or more subscribers and, as described above with reference to AUR cache 410 of FIG. 4, the data stored for each subscriber would include a dynamic data structure (such as a linked list or a hashed table) comprising usernames and aliases which correspond to one or more users that the subscriber attempts to contact on, e.g., a more than infrequent basis. The difference between AUR cache 510 of FIG. 5 and AUR cache 410 of FIG. 4 is the location of the AUR cache, i.e., the AUR cache of FIG. 5 is maintained in connection with the AUR system and accessed remotely by a subscriber through gateway 180. In this way, it would enable in a practical way an AUR cache having a larger memory capacity, to serve a larger base of subscribers.

Although neither AUR Web site host server 185 nor user Web site host server 190 (each shown in FIG. 1) are depicted in FIGS. 4 or 5, those skilled in the art will recognize that either AUR Web site host server 185 or user Web site host server 190 could be utilized in the alternative embodiments described in connection with FIGS. 4 and 5 in the same or similar manner described above in connection with FIG. 1.

Additional capabilities of the present invention, applicable to each of the above embodiments, will now be described. One additional capability enables the AUR system 170 (shown in FIG. 1) to be automatically updated—entries in the AUR database are changed dynamically as they are added or modified: e.g., ReachNumber is added (and removed) as the user travels; ModemIP is added (and removed) as the user dials into an IP network via modem, etc. In order for this to occur, there has to be a connection between the user and the AUR system (in order to define and enter the ReachNumber) and between communications machines and the AUR (in order to define and enter the ModemIP address or an active cellular number). In addition, other changes could be automatically made in the AUR database, such that the AUR database is kept up-to-date (e.g., the AUR system could receive periodic updates of home phone numbers from local carriers, etc.). A user may also update that user's entries in the AUR database; the user's ability to do so may be subject to verification of the user's identity for security purposes.

An extension of the user's ability to establish preferences for being contacted or communicated with is to make the preferred options—whether based upon the identity of the subscriber attempting to contact the user, or upon time of the day, upon day of the week, or upon other circumstances, etc.—be learned by the AUR system in accordance with how the individual reacts to communications from different subscribers. There are many techniques useful for implementing a learning feature known to those skilled in the art. The learning could, illustratively, take place whether by looking at past behavior of the user to different calling patterns, or by studying the patterns of new users for a selected period to learn their preferences and behaviors. Thus, for example, if the individual always calls someone who beeps them immediately, then the system would learn to change priorities to calling an active phone number rather than the pager for that user. Alternatively, the system could automatically add entries to the cache whenever a user communicates with a new individual on a somewhat regular basis. Similarly, the AUR may eliminate entries from the cache whenever they were unused for some specified period of time.

The learning feature described above may be added to the brokering process in one embodiment of the present invention. In another embodiment of the present invention, the learning capability described above is included, but the brokering process is not included.

Those skilled in the art will recognize that the above-described learning capability of the AUR system with respect to the "preference" features—under which the AUR system may learn the user's preferred options—may also be extended to the AUR cache described above with reference to FIGS. 4 or 5. Thus, the AUR cache may store subscriber preferences for contacting a particular user or users; the AUR cache may also learn subscriber preferences based upon subscriber interaction with the AUR system in connection with one or more particular users. For example, the pointer information for a given user may be added to or subtracted from a subscriber's AUR cache based upon a given number of requests by the subscriber for user contact information made within a fixed or variable period of time.

Another extension of the AUR system includes a "Find Me" service whereby a user appends an audio message along with the user record in the AUR database providing information about contacting the user, such as announcing where the user can be located during periods of travel, afternoon outings to the mall, etc. This would be especially useful for family members who want to track down children, parents, relatives, etc. Access to such "Find Me" service information for a particular user could be restricted to selected lists of individuals for security purposes, e.g., in order to prevent thieves from finding out when an individual is away from home, etc.

In summary, a system for creating and accessing an Active User Registry has been described that enables a subscriber to obtain an appropriate option for communicating with a user.

What has been described is merely illustrative of the application of the principles of the present invention. Other arrangements and methods can be implemented by those skilled in the art without departing from the spirit and scope of the present invention.

What is claimed is:

1. An active user registry system responsive to a request for communications contact information corresponding to a user, comprising:
   a. a computer;
   b. a database, linked to the computer, containing communications information for contacting the user including a user identifier, a plurality of communications addresses and information corresponding to the user's preferred communications options; wherein the system determines a communications address for contacting the user in accordance with a comparison between a communications option accompanying the request and the user's preferred communications options; and
   c. a cache coupled to the database for storing information, for a particular subscriber, corresponding to an entry point to communications information for contacting the user stored in the database;
   wherein the information stored in the cache for a particular subscriber is updated in accordance with a pattern of communications options utilized over time by the subscriber upon access to the database.

2. An active user registry system responsive to a request for communications contact information corresponding to a user, comprising:
   a. computer, and;
   b. a database, linked to the computer, containing communications information for contacting the user including a user identifier, a plurality of communications addresses and information corresponding to the user's preferred communications options; wherein the system determines a communications address for contacting the user in accordance with a comparison between a communications option accompanying the request and the user's preferred communications options;
   wherein information corresponding to the user's preferred communications options is automatically learned in accordance with how the user interacts with communication attempts from other persons.

3. An active user registry system responsive to a request for communications contact information corresponding to a user, comprising:
   a. a computer; and
   b. a database, linked to the computer, containing communications information for contacting the user including a user identifier, a plurality of communications addresses and information corresponding to the user's preferred communications options;
   wherein information corresponding to the user's preferred communications options is automatically learned in accordance with how the user interacts with communication attempts from other persons.

4. The system according to claim 3, wherein the user identifier includes information representing at least one of the user's identity, the user's title, the user's occupation or personal information corresponding to the user.

5. The system according to claim 3, wherein the plurality of communications addresses includes an address for contacting the user by telephone, an address for contacting the user by e-mail, an address for contacting the user by facsimile, and a current address for making direct communications contact with the user.

6. The system according to claim 4, wherein the plurality of communications addresses further includes an address for contacting the user by videophone.

7. The system according to claim 4, wherein the plurality of communications addresses further includes an address for contacting the user by voice messaging.

8. The system according to claim 5, wherein the plurality of communications addresses further includes an address for contacting the user by real-time IP messaging.

9. The system according to claim 5, wherein the plurality of communications addresses further includes a URL-compatible address for linking to a Web page associated with the user.

10. The system according to claim 3, wherein the information corresponding to the user's preferred communications options includes a communications option and at least one of the time of day, the day of the week, or information representing the identity of a person attempting to contact the user.

11. The system according to claim 3, wherein the information corresponding to the user's preferred communications options includes information received over a communications link from a personal information source associated with the user.

12. The system according to claim 3, further comprising a voice interface for enabling interaction with, and control and management of, the system from any available voice-compatible communication interface.

13. The system according to claim 3, further comprising a cache coupled to the database for storing information, for a particular subscriber, corresponding to an entry point to communications information for contacting the user stored in the database.

14. The system according to claim 13, wherein the information stored in the cache for a particular subscriber is updated in accordance with a pattern of communications options utilized over time by the subscriber upon access to the database.

15. A method of operating an active user registry service accessible over a communications network, comprising the steps of
  a. receiving a request for communications contact information corresponding to a user;
  b. searching a database containing communications information for contacting the user including a user identifier, a plurality of communications addresses and information corresponding to the user's preferred communications options; and
  c. determining a communications address for contacting the user in accordance with a comparison between a communications option accompanying the request and the user's preferred communications options;
wherein the step of receiving a request for a communications address for contacting the user includes the step of retrieving from a cache maintained for a subscriber information corresponding to an entry point to communications information for contacting the user stored in the database;
  and wherein the information stored in the cache maintained for a subscriber is updated in accordance with a pattern of communications options utilized over time by the subscriber upon access to the database.

16. A method of operating an active user registry service accessible over a communications network, comprising the steps of
  a. receiving a request for communications contact information corresponding to a user;
  b. searching a database containing communications information for contacting the user including a user identifier, a plurality of communications addresses and information corresponding to the user's preferred communications options; and
  c. determining a communications address for contacting the user in accordance with a comparison between a communications option accompanying the request and the user's preferred communications options;
wherein the information corresponding to the user's preferred communications options is automatically learned in accordance with how the user interacts with communication attempts from other persons.

17. A method of operating an active user registry service accessible over a communications network, comprising the steps of:
  a. receiving a request for communications contact information corresponding to a user;
  b. searching a database containing communications information for contacting the user including a user identifier, a plurality of communications addresses and information corresponding to the user's preferred communications options; wherein the user's preferred communications options are automatically learned in accordance with how the user interacts to communications from other persons; and
  c. determining from the database a communications address for contacting the user.

18. The method according to claim 17, wherein the user identifier includes information representing at least one of the user's identity, the user's title, the user's occupation or personal information corresponding to the user.

19. The method according to claim 17, wherein the plurality of communications addresses includes an address for contacting the user by telephone, an address for contacting the user by e-mail, an address for contacting the user by facsimile, and a current address for making direct communications contact with the user.

20. The method according to claim 19, wherein the plurality of communications addresses further includes an address for contacting the user by videophone.

21. The method according to claim 19, wherein the plurality of communications addresses further includes an address for contacting the user by voice messaging.

22. The method according to claim 19, wherein the plurality of communications addresses further includes an address for contacting the user by real-time IP messaging.

23. The method according to claim 19, wherein the plurality of communications addresses further includes a URL-compatible address for linking to a Web page associated with the user.

24. The method according to claim 17, wherein the information corresponding to the user's preferred communications options includes at least one of the time of day, the day of the week, or information representing the identity of a person attempting to contact the user.

25. The method according to claim 17, wherein the information corresponding to the user's preferred communications options includes information received over a communications link from a personal information source associated with the user.

26. The method according to claim 17, further comprising the provision of a voice interface for enabling interaction with, and control and management of, the service from any available voice-compatible communication interface.

27. The method according to claim 17, wherein the step of receiving a request for a communications address for contacting the user includes the step of retrieving from a cache maintained for a subscriber information corresponding to an entry point to communications information for contacting the user stored in the database.

28. The method according to claim 27, wherein the information stored in the cache maintained for a subscriber is updated in accordance with a pattern of communications options utilized over time by the subscriber upon access to the database.

* * * * *